(12) United States Patent
Wu

(10) Patent No.: US 9,525,552 B2
(45) Date of Patent: Dec. 20, 2016

(54) AUDIO DEVICE AND METHOD FOR ADDING WATERMARK DATA TO AUDIO SIGNALS

(71) Applicant: HON HAI PRECISION INDUSTRY CO., LTD., New Taipei (TW)

(72) Inventor: Chun-Te Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 158 days.

(21) Appl. No.: 14/479,426

(22) Filed: Sep. 8, 2014

(65) Prior Publication Data

US 2015/0270970 A1    Sep. 24, 2015

(30) Foreign Application Priority Data

Mar. 21, 2014  (CN) .................. 2014 10 1078959

(51) Int. Cl.

| G06F 17/00 | (2006.01) |
|---|---|
| H04L 9/32 | (2006.01) |
| H04N 21/426 | (2011.01) |
| H04N 21/439 | (2011.01) |
| H04N 21/4627 | (2011.01) |
| H04N 21/81 | (2011.01) |
| H04N 21/8358 | (2011.01) |
| G10L 19/018 | (2013.01) |
| G10L 19/02 | (2013.01) |

(52) U.S. Cl.
CPC ............ *H04L 9/3239* (2013.01); *G10L 19/018* (2013.01); *H04N 21/42684* (2013.01); *H04N 21/439* (2013.01); *H04N 21/4627* (2013.01); *H04N 21/8106* (2013.01); *H04N 21/8358* (2013.01); *G10L 19/0212* (2013.01); *H04L 2209/608* (2013.01)

(58) Field of Classification Search
CPC . G10L 19/018; H04L 9/3239; H04L 2209/608
See application file for complete search history.

(56) References Cited

U.S. PATENT DOCUMENTS

| 2011/0182466 A1* | 7/2011 | Lin .................... G06T 1/005 382/100 |
|---|---|---|
| 2013/0223671 A1* | 8/2013 | Jin .................. H04N 21/8358 382/100 |

FOREIGN PATENT DOCUMENTS

| CN | 101093575 A | 12/2007 |
|---|---|---|
| CN | 102185843 B | 8/2013 |
| TW | 200825831 A | 6/2008 |

\* cited by examiner

*Primary Examiner* — Fan Tsang
*Assistant Examiner* — David Siegel
(74) *Attorney, Agent, or Firm* — Zhigang Ma

(57) ABSTRACT

An audio device and method for adding a watermark data to digital signals which represent audio generates a digital signature by applying a hash calculation on the hardware address of the audio device. The audio device searches for an orthogonal code in a walsh matrix. The audio device decodes audio digital signals according to the orthogonal code to output decoded data. The audio device loads the orthogonal code into an identification information of the audio device to form the watermark data in accordance with a determination that the decoded value is not equal to one of a plurality of specific values, wherein the identification information includes the hardware address of the audio device. The audio device adds the watermark data into audio digital signals.

8 Claims, 6 Drawing Sheets

AUDIO DEVICE AND METHOD FOR ADDING WATERMARK DATA TO AUDIO SIGNALS

FIELD

Embodiments of the present disclosure relate to data security.

BACKGROUND

Authentication and protection of multimedia data such as slideshows, audio files, and video files are important. When making an audio file, the original audio signal is outputted just after the conversion between analog and digital formats, thus it is difficult to find out the source of a breach of security when it happens.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
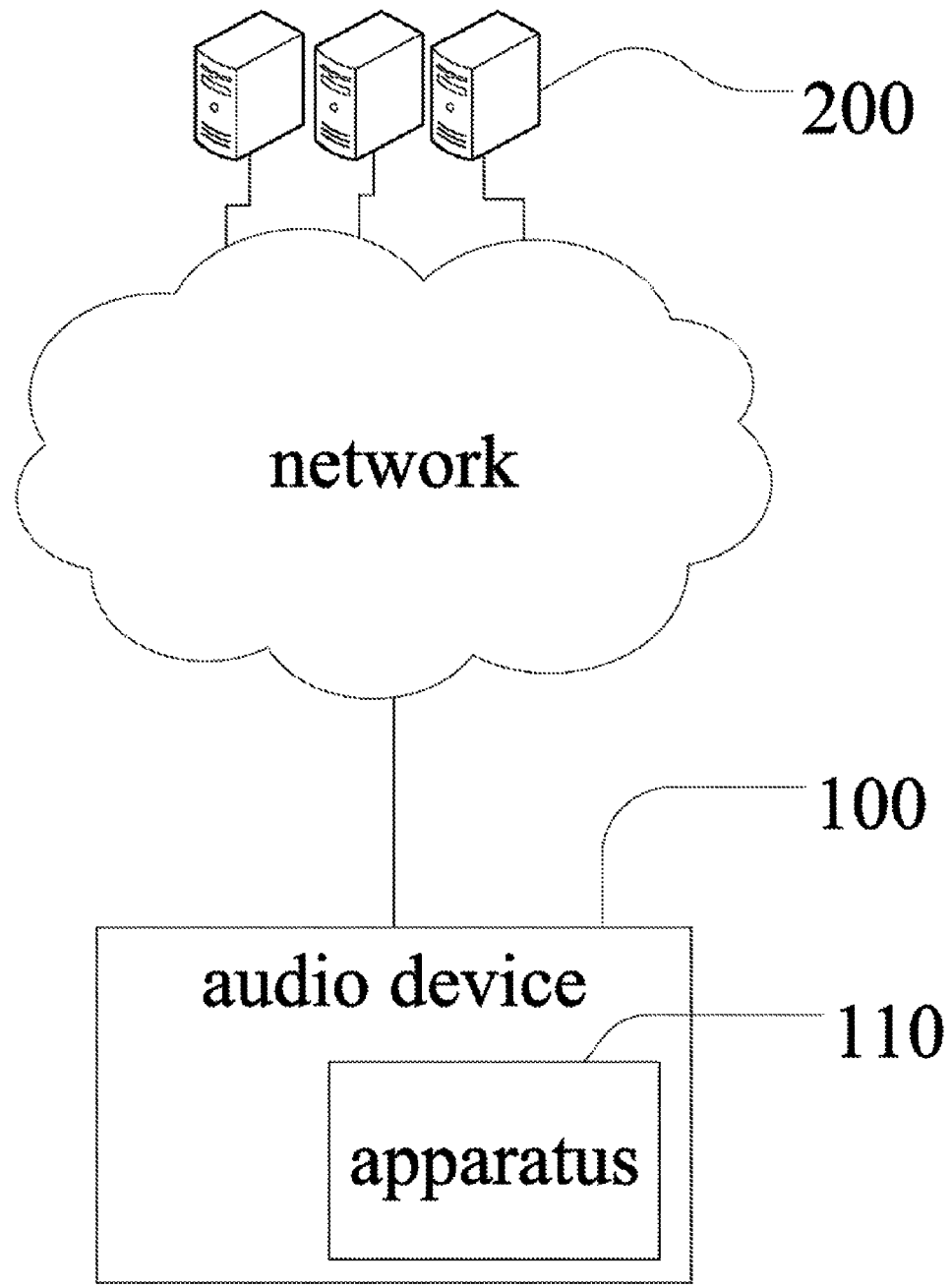
FIG. 1 illustrates an embodiment of an audio device for adding a watermark data to audio signals.

FIG. 1 illustrates an audio device 100 for adding a watermark data to audio signals of one embodiment. The audio device 100, such as a set top box, is connected with an audio server 200 through an network. The audio server 200 stores audio digital signals. The audio device 100 accesses the audio server 200 to download digital signals representing audio (audio digital signals) through the network. The audio device 100 adds the watermark data to audio digital signals. In one embodiment, the network is a wide area network (WAN). In other embodiments, the network can be a local area network (LAN) or other network.

Figure 2:
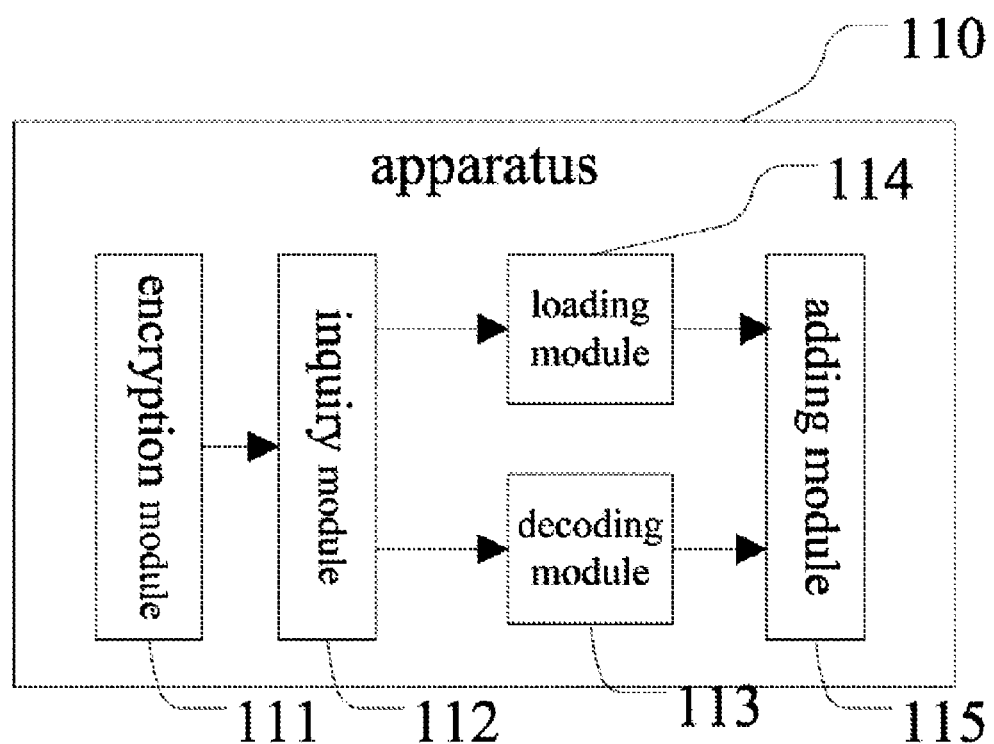
FIG. 2 is a diagrammatic view of functional modules of the audio device of one embodiment.

FIG. 2 is a diagrammatic view of functional modules of the audio device 100 of one embodiment of the present disclosure. The audio device 100 comprises a processor; and a storage system storing one or more software programs in the form of computerized codes operable to be executed by the processor. The one or more software programs comprise an encryption module 111, an inquiry module 112, a decoding module 113, a loading module 114, and an adding module 115.

The encryption module 111 uses a hash algorithm to generate a digital signature according to a hardware address of the audio device 100. The hardware address is a MAC (media access control) address. The digital signature is generated through a message-digesting algorithm which can convert the MAC address of the audio device 100 to fixed-length hash values. The fixed-length hash values are together the digital signature.

The inquiry module 112 searches for an orthogonal code corresponding to the digital signature in a walsh matrix. The walsh matrix is a specific square matrix, with dimensions to the power of 2. the entries of which are +1 or −1. and the property of the dot product of any two distinct rows (or columns) is zero. In the walsh matrix, any value corresponds to a string of code, and the inquiry module 112 can search to get the orthogonal code corresponding to the digital signature, which is a fixed-length hash value in the walsh matrix.

Figure 3:
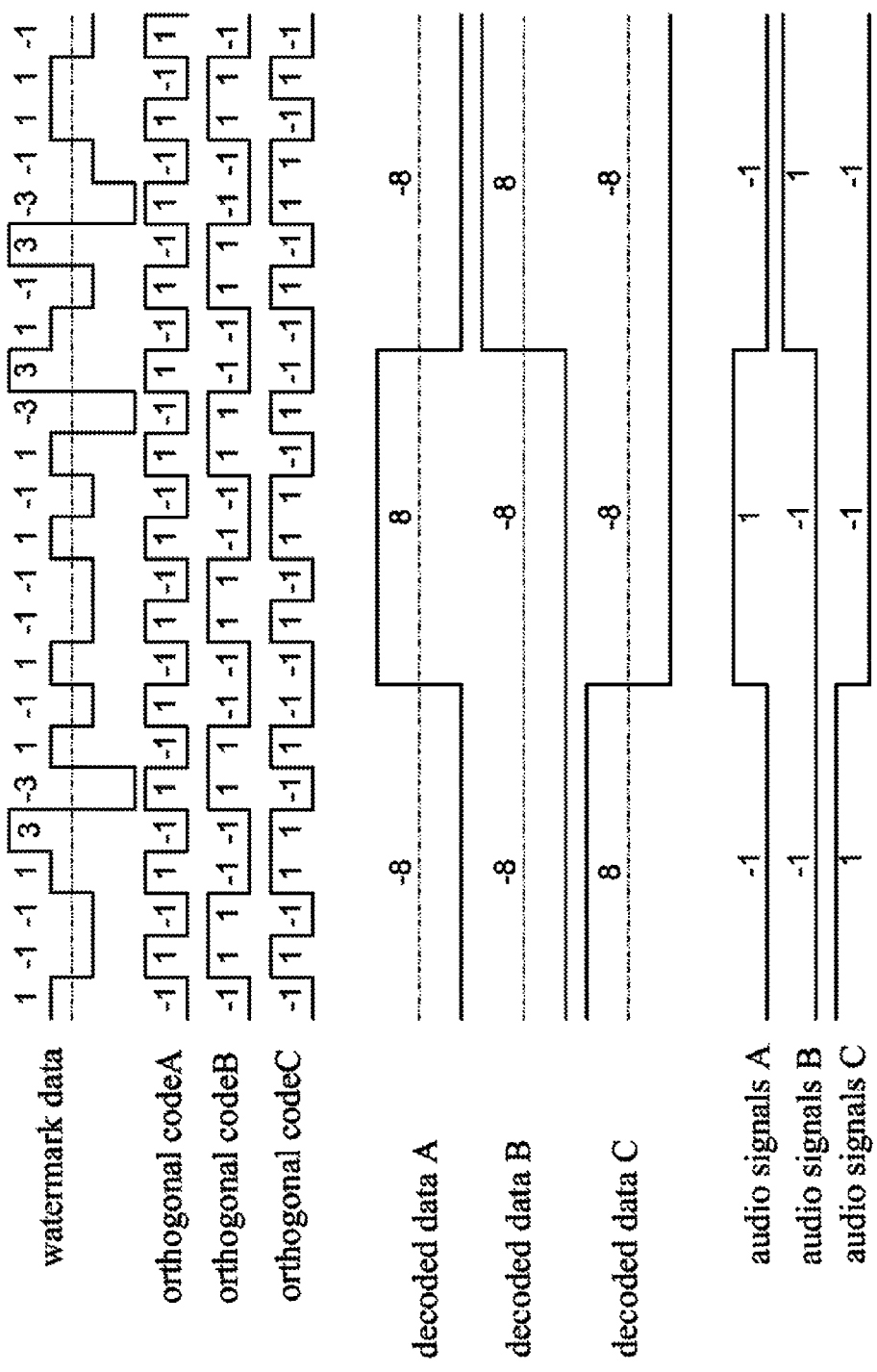
FIG. 3 illustrates a diagram of a method of the audio device decoding digital signals according to the orthogonal code to output decoded data of the embodiment.

Refering to FIG. 3, the decoding module 113 decodes the audio digital signals according to the orthogonal code to output decoded data. In one embodiment, the decoding module 113 obtains a plurality of intermediate values as a result of multiplying audio digital signals by the orthogonal code, and obtains the decoded data as a result of a summing of the plurality of intermediate values. By multiplying the orthogonal code for audio digital signals which are +1 , −1, and 0. and summing of the plurality of intermediate values, the decoding module 113 can output the decoded data. For example, the values 8 or −8 can be output.

Figure 4:
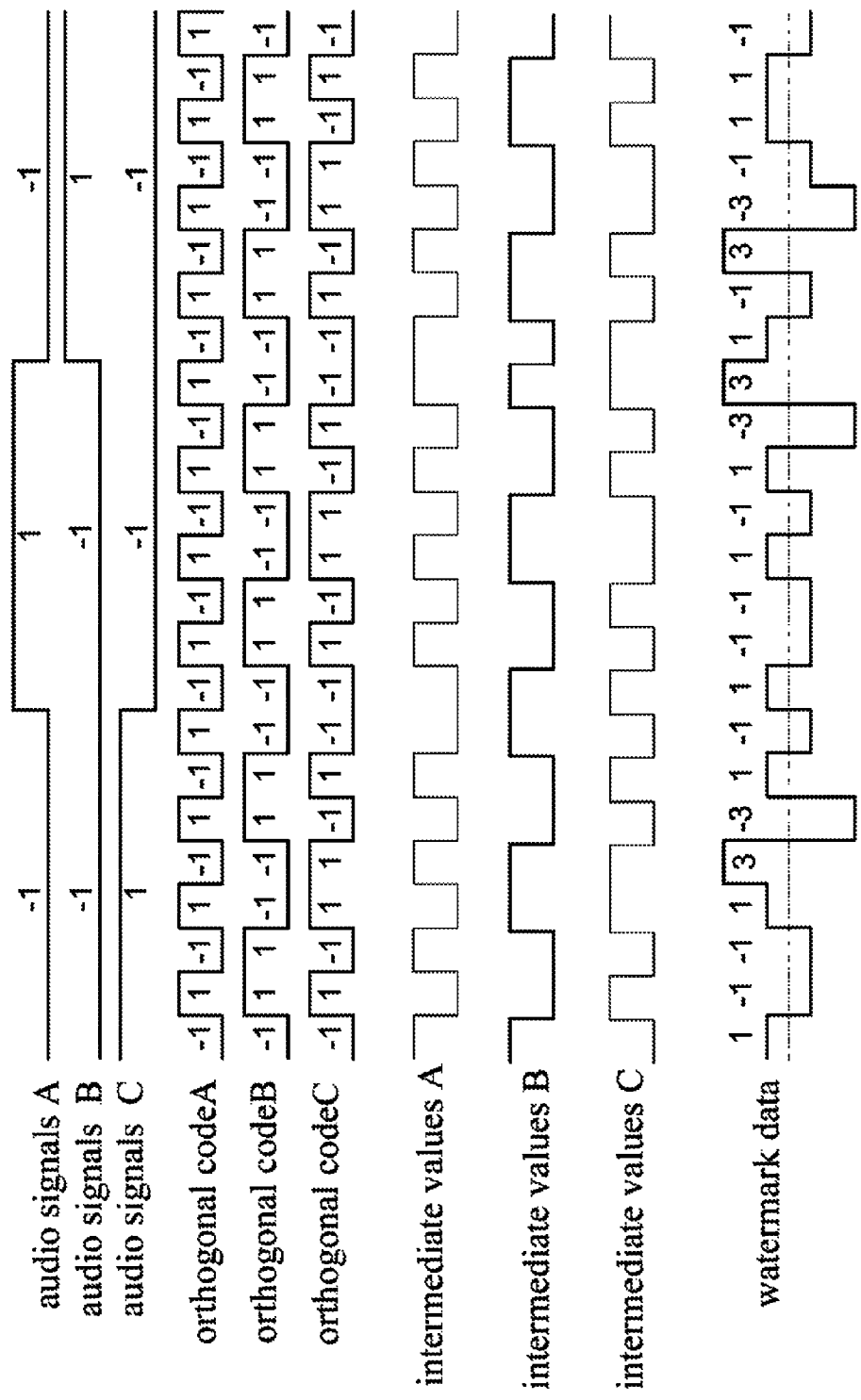
FIG. 4 illustrates a diagram of the audio device loading the orthogonal code into an identification information of the audio device to form the watermark data of the method of FIG. 2.

Referring to FIG. 4, the loading module 114 loads the orthogonal code into an identification information of the audio device to form a watermark data in accordance with a determination that the decoded value is not equal to 8 or −8. The loading module 114 performs multiplication on audio digital signals by the orthogonal code to form the watermark data. The identification information comprises the hardware address of the audio device 100. In other embodiments, the identification information further comprises the current system time of the audio device 100.

In one embodiment, the digital signature is a fixed-length hexadecimal data. The walsh matrix is 4095*4095 rows. The encryption module 111 converts the fixed-length hexadecimal data into binary data. For example, the hardware address of the audio device 100 is 00-1F-E2-4D-C9-2. The digital signature is 0C49B7DFDA05C0E8D835A8CAFA725D72 by applying a hash calculation to 00-1F-E2-4D-C9-2. The binary data corresponding to 0C49B7DFDA05C 0E8D835A8CAFA725D72 is 00001100010010011 01101111101111110110100000101110000001110100011 01100000110101101010001100101011110100111001001 01110101110010. The encryption module 111 divids the binary data into a plurality of 12-bit groups, and converts each of the plurality of groups into a plurality of decimal values. The 8-bit head of the binary data (00001100) is deleted. After that the plurality of decimal values remaining are 1179, 2015, 3488, 1472, 3725, 2101, 2700, 2810, 1829. and 3442.

The inquiry module 112 searches for the orthogonal code corresponding to one of the plurality of decimal values in the walsh matrix, and searches for a next orthogonal code corresponding to a next one of the plurality of decimal values until all of the plurality of decimal values are processed, in accordance with a determination that the decoded data is not equal to each of a plurality of specific values. For example, the inquiry module 112 searches the 3442 row of the walsh matrix, and searches the 1829 row of the walsh matrix sequentially in accordance with a determination that the decoded value is not equal to each of a plurality of specific values.

The adding module 115 adds the watermark data into audio digital signals. Since the audio digital signals comprise the watermark data, and the watermark data contains the hardware address of the audio device 100, by reversing the decoding of the audio digital signals, a breach of data security can be found by the audio device 100.

Figure 5:
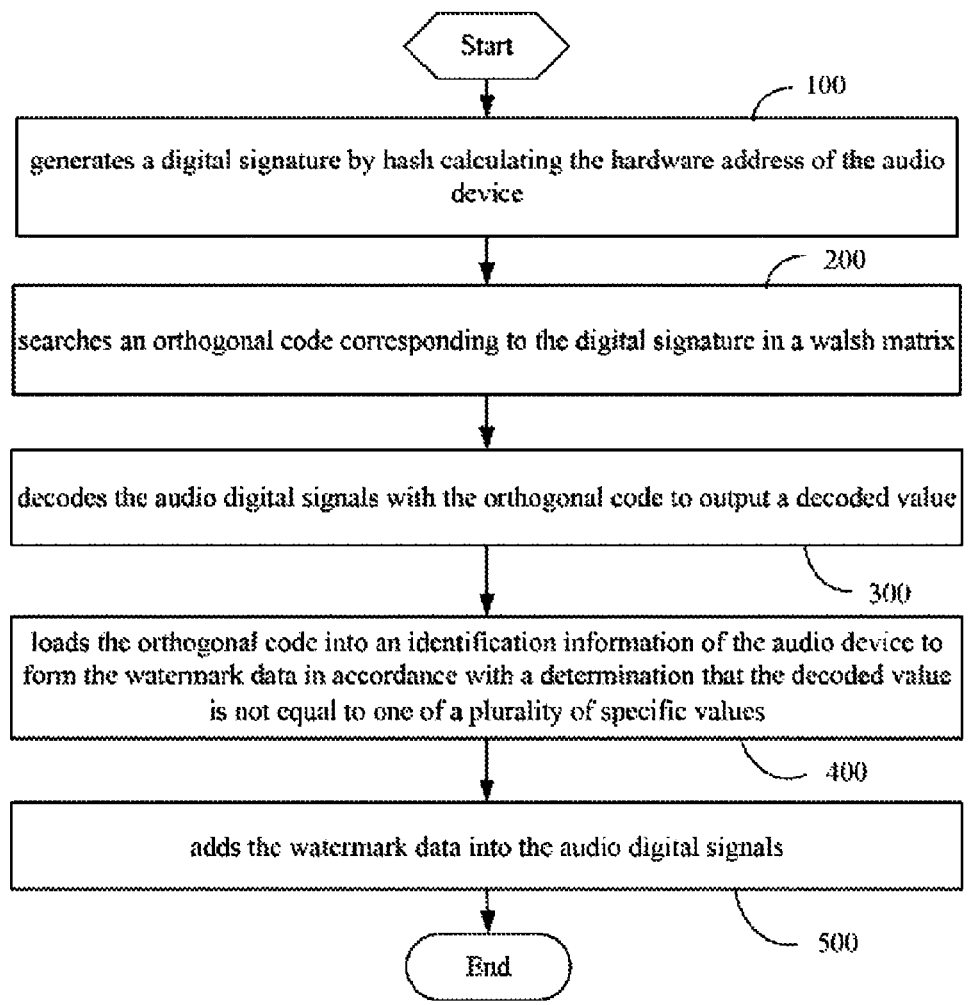
FIG. 5 illustrates a flowchart of an example method for adding a watermark data to audio signals.

FIG. 5 illustrates a flowchart of an example method for adding a watermark data to an audio digital signals. The example method is provided by way of example, as there are a variety of ways to carry out the method. The method described below can be carried out using the configurations illustrated in FIG. 2, for example, and various elements of these figures are referenced in explaining the example method. Each block shown in FIG. 5 represents one or more processes, methods, or subroutines carried out in the example method. Furthermore, the illustrated order of blocks is illustrative only, and the order of the blocks can change. Additional blocks can be added or fewer blocks may be utilized, without departing from this disclosure. The example method can begin at block 100.

In block 100, the encryption module uses a hash algorithm to generate a digital signature according to a hardware address of the audio device. The digital signature is generated through the message-digesting algorithm which can convert the hardware address of the audio device to fixed-length hash values. The fixed-length hash values are together the digital signature.

In block 200, an inquiry module searches for an orthogonal code corresponding to the digital signature in a walsh matrix. The walsh matrix is a specific square matrix, with dimensions to the power of 2, the entries of which are +1 or −1. and the property of the dot product of any two distinct rows (or columns) is zero. In the walsh matrix, any value corresponds to a string of code, and the inquiry module can search to get the orthogonal code corresponding to the digital signature which is the fixed-length hash value in the walsh matrix.

In block 300, refer to FIG. 3, a decoding module decodes audio digital signals according to the orthogonal code to output decoded data. In one embodiment, the decoding module obtains a plurality of intermediate values as a result of multiplying audio digital signals by the orthogonal code, and after that, obtains the decoded data as a result of summing the plurality of intermediate values. By multiplying the orthogonal code on audio digital signals which are +1, −1 and 0. and summing the plurality of intermediate values, the decoding module 113 can output the decoded data. For example, the values 8 or −8 can be output.

In block 400, referring to FIG. 4, a loading module loads the orthogonal code into an identification information of the audio device to form the watermark data in accordance with a determination that the decoded value is not equal to 8 or −8. The loading module performs multiplication of audio digital signals by the orthogonal code to form the watermark data. The identification information comprises the hardware address of the audio device. In other embodiments, the identification information further comprises the current system time of the audio device.

In block 500, an adding module adds the watermark data into audio digital signals. Since audio digital signals comprise the watermark data, and the watermark data contains the hardware address of the audio device, by reversing the decoding of audio digital signals, the audio device can find out when a breach of security happened on the audio device.

Figure 6:
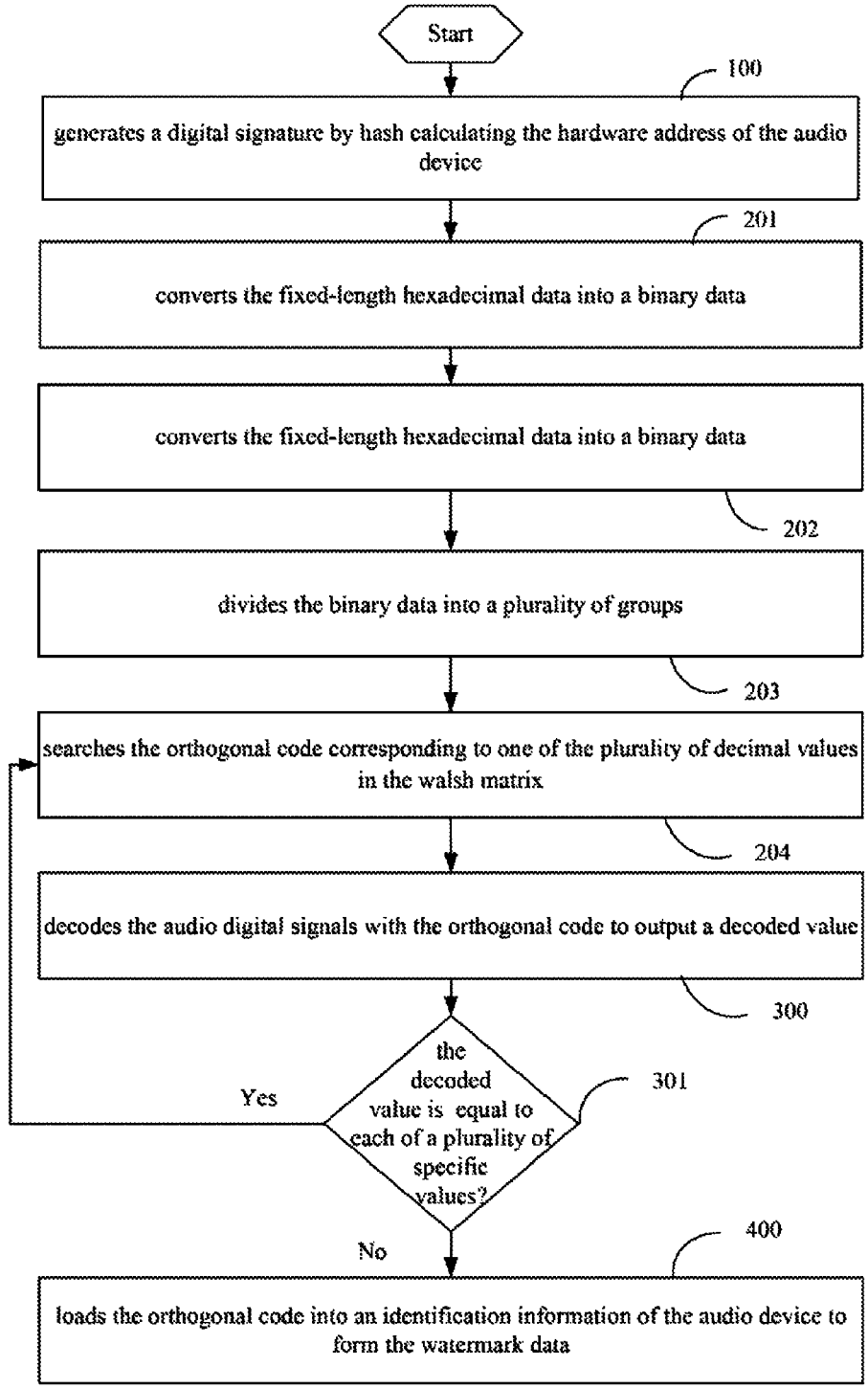
FIG. 6 illustrates a detailed flowchart of the example method of FIG. 5.

FIG. 6 illustrates a detailed flowchart of the example method of FIG. 5. The example method is provided by way of example, as there are a variety of ways to carry out the method. The method described below can be carried out using the configurations illustrated in FIG. 2, for example, and various elements of these figures are referenced in explaining the example method. Each block shown in FIG. 5 represents one or more processes, methods, or subroutines carried out in the example method. Furthermore, the illustrated order of blocks is illustrative only, and the order of the blocks can change. Additional blocks can be added or fewer blocks may be utilized without departing from this disclosure. The example method can begin at block 201.

In one embodiment, the digital signature is a fixed-length hexadecimal data, The walsh matrix is 4095*4095 rows. In block 201, the inquiry module converts the fixed-length hexadecimal data into binary data. In block 202, the encryption module converts the fixed-length hexadecimal data into binary data.

In block 203, the encryption module divides the binary data into a plurality of 12-bit groups, and converts each of the plurality of groups into a plurality of decimal values. The 8-bit head of the binary data is deleted. After that the plurality of decimal values remaining are 1179, 2015, 3488, 1472, 3725, 2101, 2700, 2810, 1829. and 3442.

In block 204. the inquiry module searches for the orthogonal code corresponding to one of the plurality of decimal values in the walsh matrix. In block 301, after the decoding module decodes audio digital signals according to the orthogonal code to output decoded data, the inquiry module searches for the next orthogonal code corresponding to next one of the plurality of decimal values until all of the plurality of decimal values are processed, in accordance with a determination that the decoded value is not equal to each of a plurality of specific values.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An audio device for adding a watermark data to audio digital signals, the audio device comprising:
   a processor; and
   a storage system storing one or more software programs in form of computerized codes operable to be executed by the processor, the one or more software programs comprising instructions for:
   using a hash algorithm to generate a digital signature according to a hardware address of the audio device;
   searching an orthogonal code corresponding to the digital signature in a walsh matrix;
   decoding the audio digital signals according to the orthogonal code to output a decoded value, wherein obtaining a plurality of intermediate values as a result of multiplying on the audio digital signals by the orthogonal code, and obtaining the decoded value as a result of summing of the plurality of intermediate values;
   loading the orthogonal code into an identification information of the audio device to form the watermark data in accordance with a determination that the decoded value is not equal to one of a plurality of specific values, wherein the identification information comprises the hardware address of the audio device; and
adding the watermark data into the audio digital signals.

2. The audio device of claim 1, wherein the digital signature is a fixed-length hexadecimal data, wherein, to search the orthogonal code corresponding to the digital signature in the walsh matrix, the one or more software programs further comprise instructions for:
converting the fixed-length hexadecimal data into a binary data;
dividing the binary data into a plurality of groups;
converting each of the plurality of groups into a plurality of decimal values; and
searching the orthogonal code corresponding to one of the plurality of decimal values in the walsh matrix.

3. The audio device of claim 2, wherein, after decoding the audio digital signals to output a decoded value, the one or more software programs further comprise instructions for:
searching a next orthogonal code corresponding to a next one of the plurality of decimal values until all of the plurality of decimal values are processed in accordance with a determination that the decoded value is not equal to each of the plurality of specific values.

4. The audio device of claim 1, wherein the watermark data is formed by performing multiplication on the audio digital signals by the orthogonal code.

5. A method for adding a watermark data to audio digital signals, comprising:
using a hash algorithm to generate a digital signature according to a hardware address of the audio device;
searching an orthogonal code corresponding to the digital signature in a walsh matrix;
decoding the audio digital signals according to the orthogonal code to output a decoded value, wherein obtaining a plurality of intermediate values as a result of multiplying on the audio digital signals by the orthogonal code, and obtaining the decoded value as a result of summing of the plurality of intermediate values;
loading the orthogonal code into an identification information of the audio device to form the watermark data in accordance with a determination that the decoded value is not equal to one of a plurality of specific values, wherein the identification information comprises the hardware address of the audio device; and
adding the watermark data into the audio digital signals.

6. The method of claim 5, wherein the digital signature is a fixed-length hexadecimal data, wherein searching the orthogonal code comprises:
converting the fixed-length hexadecimal data into a binary data;
dividing the binary data into a plurality of groups;
converting each of the plurality of groups into a plurality of decimal values; and
searching the orthogonal code corresponding to one of the plurality of decimal values in the walsh matrix.

7. The method of claim 6, after decoding the audio digital signals to output a decoded value, further comprising:
searching a next orthogonal code corresponding to a next one of the plurality of decimal values until all of the plurality of decimal values are processed in accordance with a determination that the decoded value is not equal to each of the plurality of specific values.

8. The method of claim 1, wherein the watermark data is formed by performing multiplication on the audio digital signals by the orthogonal code.

* * * * *